United States Patent [19]

Pomphrey, Jr.

[11] Patent Number: 4,530,602

[45] Date of Patent: Jul. 23, 1985

[54] INTERFACE ALIGNMENT SYSTEM

[75] Inventor: Patrick J. Pomphrey, Jr., Huntington Beach, Calif.

[73] Assignee: The United States of America as represented by the Secretary of the Air Force, Washington, D.C.

[21] Appl. No.: 480,156

[22] Filed: Mar. 29, 1983

[51] Int. Cl.³ .............................................. G01B 11/26
[52] U.S. Cl. .................................... 356/138; 356/153
[58] Field of Search ............... 356/138, 152, 153, 399, 356/400

[56] References Cited

U.S. PATENT DOCUMENTS

| | | | |
|---|---|---|---|
| 3,628,869 | 12/1971 | Clay et al. | 356/153 |
| 3,919,663 | 11/1975 | Caruolo et al. | 331/94.5 C |
| 4,144,505 | 3/1979 | Angelbeck et al. | 331/94.5 C |
| 4,146,329 | 3/1979 | King et al. | 356/152 |
| 4,213,704 | 7/1980 | Burns et al. | 356/349 |
| 4,422,758 | 12/1983 | Godfrey et al. | 356/152 |

FOREIGN PATENT DOCUMENTS 346708  7/1960  Switzerland ........................ 356/153

*Primary Examiner*—R. A. Rosenberger
*Attorney, Agent, or Firm*—Donald J. Singer; Bobby D. Scearce

[57] ABSTRACT

A novel optical alignment system and method is provided for detecting misalignment of the optical components of a high energy laser comprising a source of radiation, such as a HeNe laser, for providing an alignment beam to intersect the optical path of the high energy system, optical beam splitting means at the intersection of the alignment beam and optical path to direct a first portion of the alignment beam toward the target and a second portion to the high energy cavity, the second portion interacting with the high energy cavity to provide a return beam along the alignment beam axis, and means to display and view the return beam relative to the alignment beam axis.

8 Claims, 2 Drawing Figures

INTERFACE ALIGNMENT SYSTEM

RIGHTS OF THE GOVERNMENT

The invention described herein may be manufactured and used by or for the Government of the United States for all governmental purposes without the payment of any royalty.

BACKGROUND OF THE INVENTION

The present invention relates generally to optical alignment systems and more specifically to an optical system for detecting misalignment of the optical components of high energy laser systems.

The efficient operation of high energy laser systems requires first that the optical components comprising the optical resonant cavity of the laser and the reflective elements comprising the optical train, through which the high energy laser beam output is coupled and directed toward a target, be in substantially perfect optical alignment. Precision alignment of the optics of a high energy laser is particularly critical since even slight misalignment can result in severe reduction in beam output power or undesirable multimode beam characteristics. Further, damage to the optical components or other structures comprising the high energy laser system may often result if the high energy beam generated by the system itself is used in an attempt to align the optical components of the high energy laser system. Therefore, a collimated light beam from an external source, such as a low power helium neon (HeNe) laser, has conventionally been used as a reference beam, directed into the optical path of the high energy laser system, to verify the alignment of the optical components comprising the high energy laser system.

Existing manual alignment systems or methods generally involve one or more of the following: (1) temporary removal of an optical component (such as a mirror) from the high energy laser optical train to provide access for the alignment beam to align the remaining components, followed by replacement of the temporarily removed component and alignment thereof using high energy cavity generated radiation; (2) use of an apertured optical component in the optical train of the high energy system to provide access of the alignment beam to the high energy optical path; (3) use of an alignment beam directed into the high energy beam path and the resonant cavity parallel to and offset from the optical axis of the high energy beam.

The principal disadvantages of these methods include lack of simultaneous alignment of all of the optical components comprising the high energy beam optical train prior to high energy laser operation, undesirable modification to optical train components to accommodate the alignment beam, and relative inaccessibility of the optical path for routine or periodic pre-run alignment checks.

Certain automatic alignment systems described previously are extremely accurate but generally comprise complicated and expensive components for their implementation and use. For example, such systems may include computer controlled mirror mounts and utilize a low power laser alignment beam to actuate the alignment via closed loop detectors (position sensors); such systems may further require high power grating rhomb mirrors to perform low power sampling for alignment purposes. Since the autoalignment systems typically do not respond immediately during the initial transient phase of a laser experiment, damage to external elements may be experienced during the time the autoalignment system is attempting to align the high energy laser optical components. In extreme cases, the external laser optical train may be so far out of co-alignment with the internal laser cavity optical components that the resulting laser mode is unsuitable for continued testing. Such an unknown state of laser cavity and optical train co-alignment may result in expensive downtime for the laser system, damage to the laser system components, and reduced confidence that the entire optical system is properly aligned.

The alignment system of the present invention interfaces with the optical path of a high energy laser system at any convenient access thereto, provides rapid and accurate determination of any misalignment in the entire optical system of the high energy laser system, and facilitates the precision alignment thereof without the necessity for operation of the high energy system or for modification of any of the components thereof. Only an access to the high energy beam path is required. The alignment system of the present invention may be packaged as a self-contained system, modularized, and used on a wide variety of laser systems. Alignment may be accomplished in a desirably short time with a high degree of precision. The invention may be particularly useful in the alignment of industrial laser welders, such as the $CO_2$ type.

It is, therefore, a principal object of the present invention to provide an improved optical alignment system.

It is a further object of the invention to provide an optical alignment system for detecting misalignment of the optics of a high energy laser generating system.

It is a further object of the invention to provide an optical alignment system for a high energy laser system which is characterized by its simplicity, high precision and reliability.

These and other objects of the present invention will become apparent as the detailed description of certain representative embodiments thereof proceeds.

SUMMARY OF THE INVENTION

In accordance with the foregoing principles and objects of the present invention, a novel optical alignment system and method is provided for detecting misalignment of the optical components of a high energy laser, comprising a low power source of radiation, such as a helium neon (HeNe) laser, for providing an alignment beam to intersect the optical path of the high energy system, optical beam splitting means at the intersection of the alignment beam and optical path to direct a first portion of the alignment beam toward the end-point (target) and a second portion to the high energy cavity, the second portion interacting with the high energy cavity to provide a return beam along the alignment beam axis, and means to display and view the return beam relative to the alignment beam axis.

DESCRIPTION OF THE DRAWINGS

The present invention will be more clearly understood from the following detailed description of certain representative embodiments thereof read in conjunction with the accompanying drawings wherein.

DETAILED DESCRIPTION

Figure 1:
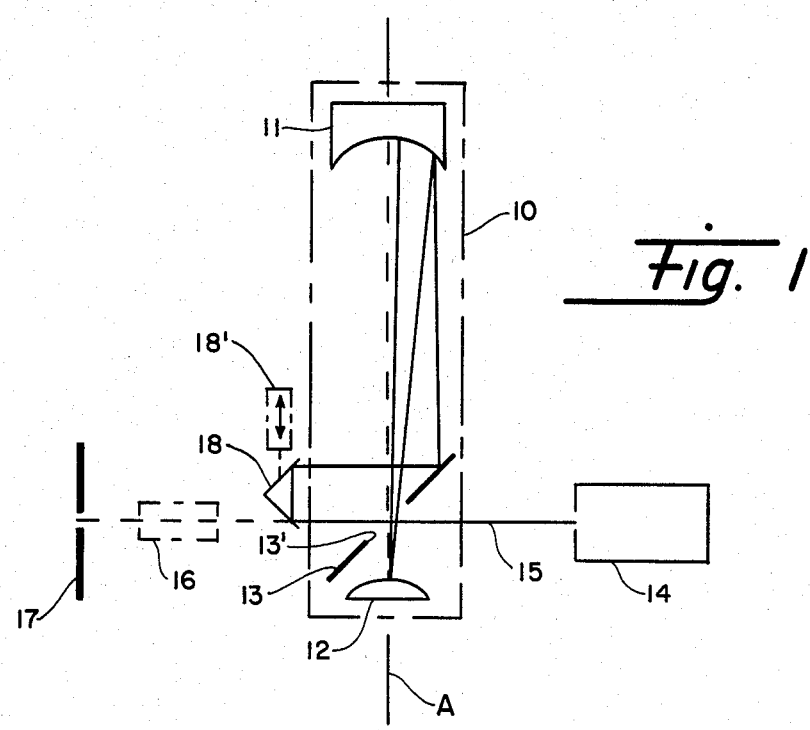
FIG. 1 is a schematic plan view of a representative high energy laser system which may be aligned using the alignment system of the present invention.

Referring now to FIG. 1, shown therein is a schematic representation of a high energy laser system including an unstable resonator cavity 10. Cavity 10, together with associated optics (illustrated schematically as optical train 16) are representative of any of the well known types of high power laser generating systems for which optical alignment may be accomplished using the alignment system of the present invention. Resonator cavity 10 may be defined between concave end mirror 11 and convex end mirror 12, and may include a scraper mirror 13, having a central hole 13', whereby radiation may be extracted from resonator cavity 10 and coupled with the associated external optics represented by optical train 16. Conventional alignment systems and methods for aligning cavity 10 and its associated optics may include an alignment laser, such as HeNe laser 14 or the like, directing an alignment beam 15 at a right angle to the optical axis A of resonator 10, through hole 13' in scraper mirror 13, and down the optical train 16 of the high power laser system to target 17. Once an initial alignment of optical train 16 is accomplished using alignment beam 15, a corner cube reflector 18 or the like is moved into position, using means 18', such as shown in FIG. 1, to block further access to the optical train 16 and target 17. Parallel work on the optical train 16 then cannot proceed until the resonator 10 alignment is complete. The corner cube 18 diverts the alignment beam 15 to the front surface of the scraper mirror 13 which is adjusted until the beam traversing the resonator is parallel to the desired optical axis A which is defined to be parallel to nozzle exit plane or other suitable mechanical reference. Additional steps, not illustrated in FIG. 1, are then accomplished to provide a so-called "regurgitated" beam, which is the result of many internal passes of the visible light through the resonator 10, finally outcoupling by diffration from the resonator 10. This beam is observed at the region around the hole 13' in the scraper mirror 13 and on any transparent viewing surface placed between the scraper mirror 13 and the corner cube reflector 18. Once the corner cube reflector 18 is removed, however, all reference to the resonator 10 cavity-optical train 16 co-alignment is lost. In order to reacquire this reference, the initial step at least must be repeated, that is, the initial check of parallelism with the nozzle exit plane or other mechanical reference. Both the initial alignment and the recheck are very time consuming, hence costly, procedures.

Figure 2:
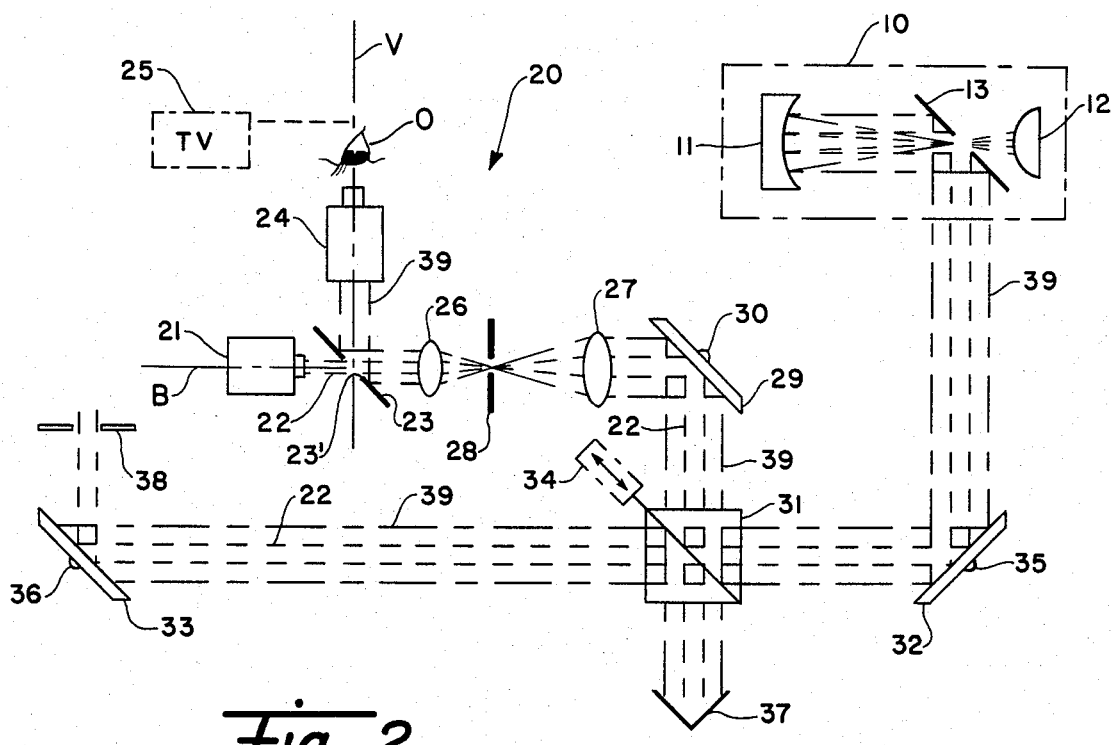
FIG. 2 is a schematic plan view of one embodiment of the optical alignment system of the present invention.

The present invention is shown in the schematic plan view presented in FIG. 2. A laser resonator 10, similar to that of FIG. 1, is of the type for which alignment using the alignment system 20 of the invention herein may be required. Alignment system 20 of the present invention includes a source of radiation to provide an alignment beam, such as a HeNe laser 21 or other low power laser, or other source of light providing a suitably collimated alignment light beam 22. A turning mirror 23 has a central hole 23' for passage therethrough of beam 22. Viewing telescope 24 provides means for observer O to observe the state of alignment as detected by alignment system 20 and is disposed along a viewing axis V perpendicular to and intersecting beam axis B at the central hole 23' in mirror 23. Television monitor 25 or other electronic recording means may be provided to observe and/or record the alignment beam 22 feed back information as hereinafter described. An astronomical-type telescope including lenses 26 and 27 suitably positioned to define a common focal point therebetween is disposed along alignment beam axis B substantially as shown. A pinhole aperture 28 is disposed at the intermediate focal point to provide a target for the return beam of the alignment system 20. Lenses 26, 27 provide representative means to collimate alignment beam 22 to any desirable beam size, depending on the specific requirements of the high energy laser system being examined. A beam splitting means in the form of beam splitter 31 is positioned at the intersection of the optical axis B of alignment beam 22 and the axis of the high energy laser beam output of resonator 10 to direct a portion of beam 22 toward target 38 and a portion toward resonator 10. Access to the output beam path of resonator 10 may be effected using folding mirrors 32 and 33 inserted into the path. Further, a folding mirror 29 having an adjustable gimbal type mounting and having means 30 connected thereto for remote positioning thereof may be included to fold beam 22 toward beam splitter 31. Beam splitter 31 is position adjustable and may be remotely actuated using actuator 34 to selectively position beam splitter 31 at the intersection of alignment beam axis B and the optical path of the resonator 10. Folding mirrors 32, 33 have adjustable gimbal type mountings and may be remotely controlled using actuators 35, 36 for controlling the positions of their respective reflective surfaces. Mirrors 32, 33 may form a part of the optics of the high energy laser for which alignment is sought, whereby the high energy laser beam is controlled, and also serve as part of the optics of the alignment system 20 of the present invention. A corner cube reflector 37 is positioned along the (folded) beam 22 axis B so that alignment beam 22 is in part simultaneously transmitted by beam splitter 31 along the output beam path of resonator 10 both toward resonator 10 and toward target 38. Alternatively, the rear surface 31a of beam splitter 31 may comprise an internally reflective surface for the purpose of directing a portion of beam 22 toward target 38.

In the determination of the state of alignment of resonator 10, an alignment beam 22, generated by alignment laser 21, is directed through the central hole 23' in mirror 23 and through the lens system including lenses 26, 27. The central hole 23' in mirror 23 is sized to pass the return beam and to prevent substantial laser light from being directly reflected along axis V to observer O or recorder/monitor 25. Objective lens 27 serves to collimate alignment beam 22 or allows observer O to adjust the alignment beam 22 wavefront curvature to the anticipated high energy laser beam wavefront curvature. Beam 22 is then propagated in both transverse directions by beam splitter 31, viz., the front of beam splitter 31 reflecting beam 22 toward resonator 10 and the rear of beam splitter 31 reflecting the beam 22 (as reflected by corner cube 37) toward the target 38. Depending on the type of beam splitter used, there may be some parallel displacement of the rear reflected (from corner cube 37) portion of beam 22.

The state of alignment of resonator 10 is determined by directing the alignment beam 22 at the center of the hole in scraper mirror 13. Alignment beam 22 may be collimated as to be larger than the hole in scraper mirror, so that it is reflected into the cavity of resonator cavity 10, defined by concave mirror 11 and convex mirror 12, where beam 22 is successively demagnified to provide a diffracted output return beam 39 appearing at the edges defining the hole in scraper mirror 13. Alternatively, but less desirably, alignment beam 22 may be formed as a small diameter beam and directed parallel to and offset slightly from the optical axis of the high energy beam path passing through the central hole of scraper mirror 13 so that the alignment beam 22 strikes scraper mirror 13 to the side of the hole therein; a diffracted output return beam 39 will likewise appear. Alignment beam 22 may be suitably adjusted in position to strike scraper mirror 13 through appropriate adjustments of the orientations of the reflective surfaces of folding mirrors 29 and 32 and beam splitter 31.

The diffracted return beam 39 is directed back along the optical path defined by folding mirror 32, beam splitter 31, and optical folding mirrors 29 and 23 for viewing by observer O (or recorder/monitor 25) along viewing axis V. The return beam 39 is demagnified by the lens system 26, 27, but has expanded slightly due to diffraction in the various components in its optical path so that it may be displayed on the reflective surface of mirror 23 around the central hole 23' for observation and position comparison with the alignment beam 22 by observer O.

If alignment system 20 is co-aligned with the resonator 10 axis, return beam 39 will appear to be centered about the hole in scraper mirror 13 and about the aperture 28 in the focal plane of the beam expander lens system 26, 27. The pinhole of aperture 28 thus becomes the reference point of the alignment system 20. Observer O, by finding the position of return beam 39 axis may then decide if resonator 10 is in an acceptable state of alignment. It is noteworthy that the alignment determination does not require access or disassembly of the laser resonator 10 or its associated optical system, but merely access to the optical path of the output of resonator 10 using the beam splitter 31, and, optionally, adjustable turning mirrors 32, 33.

The corner cube reflector 37 is positioned to reflect light along the (folded) beam axis B, therefore, the rearward reflecting surface of beam splitter 31 directs both the alignment beam and the resonator beam 39 to the target 38. Adjustment of folding mirror 33 thus permits accurate simultaneous pointing of both beams 22 and 39. Beam splitter 31 may then be removed from the optical path of the resonator with the assurance that the high energy laser beam output of resonator 10 will hit the target 38.

The present invention, as hereinabove described, therefore provides an improved optical alignment system particularly useful for detecting and correcting misalignment in the optical system of a high energy laser. It is understood that certain modifications and substitutions of equivalent component parts to the invention may be made as might occur to one with skill in the applicable field, within the scope of the appended claims. Therefore, all embodiments contemplated hereunder have not been shown in complete detail. Other embodiments may be developed without departing from the spirit of the invention or from the scope of the appended claims.

We claim:

1. An optical system for detecting misalignment of the optical components of a high energy laser having an unstable resonator including a scraper mirror and an optical train for directing a high energy laser beam along an optical axis to a target, comprising:
    a. a source of radiation providing an alignment beam, said source positioned to direct said beam along a beam axis perpendicular to and intersecting said optical axis of said high energy laser;
    b. optical beam splitting means, disposed at the intersection of said alignment beam axis and said optical axis, for directing a first portion of said alignment beam along said optical axis to said target, and for directing a second portion of said alignment beam along said optical path to said resonator, said second portion interacting with said resonator to provide a return beam from said resonator along said optical path and said beam axis toward said radiation source; and
    c. means, disposed along said alignment beam axis intermediate said source and said beam splitting means, for displaying said return beam relative to said alignment beam axis.

2. The optical system as recited in claim 1 further comprising means, disposed along said alignment beam axis and intermediate said radiation source and said beam splitting means, for collimating said alignment beam to a predetermined beam size.

3. The optical system as recited in claim 1 wherein said source of radiation comprises a HeNe laser.

4. The optical system as recited in claim 1 further comprising means, coupled to said beam splitting means, for selectively positioning said beam splitting means.

5. The optical system as recited in claim 1, wherein said display means for said return beam comprises a turning mirror disposed along said beam axis for optically folding said return beam away from said beam axis, said turning mirror defining a central hole, of size smaller than said return beam, for conducting therethrough said alignment beam, and further comprising means for viewing said folded return beam.

6. A method for detecting misalignment of the optical components of a high energy laser having an unstable resonator including a scraper mirror and an optical train for directing a high energy beam along an optical axis to a target, comprising the steps of:
    a. providing an alignment beam from an external source of radiation;
    b. directing said alignment beam toward said optical axis along a beam axis perpendicular to and intersecting said optical axis intermediate said resonator and target;
    c. splitting said alignment beam into first and second portions, and directing said first alignment beam portion along said optical axis to said target and said second alignment beam portion along said optical axis to said resonator, said second alignment beam portion interacting with said resonator to provide a return beam from said resonator along said optical axis;
    d. splitting said return beam into first and second portions, and directing said first return beam portion along said optical axis to said target, and said second return beam portion along said alignment beam axis toward said source;
    e. comparing said first alignment beam portion with said first return beam portion to determine the relative alignment therebetween; and
    f. comparing said alignment beam with said second return beam portion to determine the relative alignment therebetween.

7. The method of claim 6 further comprising, following step a thereof, the step of collimating said alignment beam to preselected beam size.

8. The method of claim 6 wherein said external source of radiation comprises a HeNe laser.

* * * * *